INVENTOR
Roger W. Dudley
BY Shoemaker and Mattare
ATTORNEYS

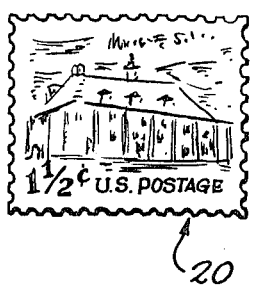
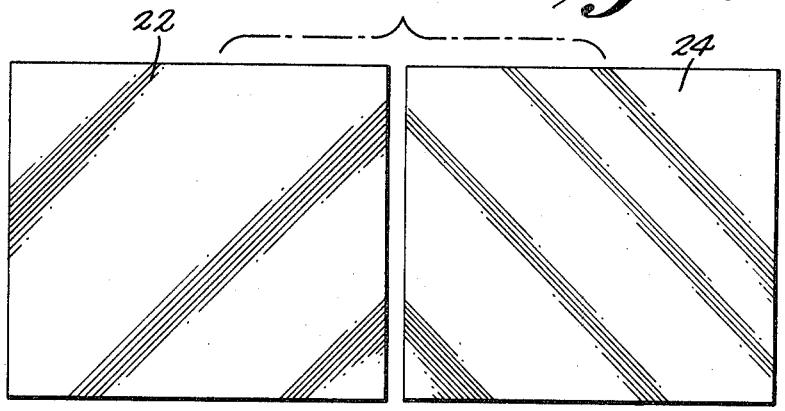
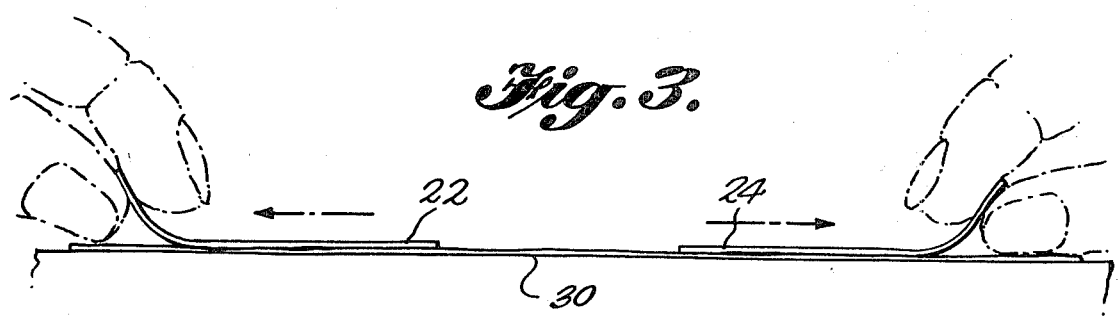
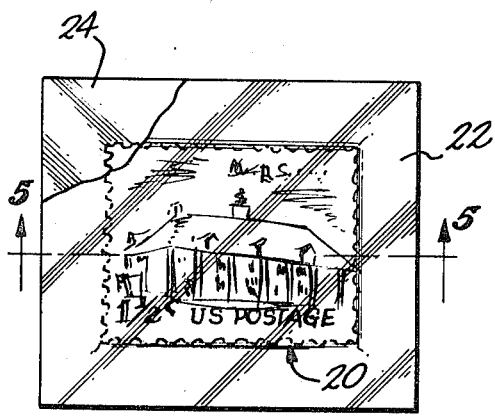
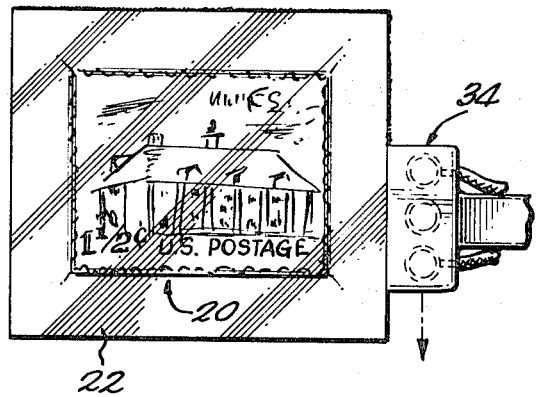
INVENTOR
Roger W. Dudley Aug. 4, 1970  R. W. DUDLEY  3,522,673
RETRIEVABLE ENCAPSULATED ARTICLE AND METHOD OF MAKING
AND RETRIEVING SAME
Filed Sept. 20, 1967  2 Sheets-Sheet 2

United States Patent Office 3,522,673
Patented Aug. 4, 1970

3,522,673
RETRIEVABLE ENCAPSULATED ARTICLE AND
METHOD OF MAKING AND RETRIEVING SAME
Roger W. Dudley, Falls Church, Va., assignor to Top-A-Telix Corporation, Washington, D.C.
Filed Sept. 20, 1967, Ser. No. 669,042
Int. Cl. G09f 1/10
U.S. Cl. 40—158                    9 Claims

ABSTRACT OF THE DISCLOSURE

An article to be retrieved is enclosed within a protective envelope means which in turn is embedded within the central portion of a body of material. The envelope means and the body of material are formed of transparent material so that the article may be displayed. The article may be retrieved by penetrating and gaining access by any suitable means to the embedded article through the surrounding body of material and the envelope means so that the article is not damaged.

BACKGROUND OF THE INVENTION

The present invention relates to articles which are embeded in transparent material such as clear plastic or clear glass for display purposes. The articles so embedded may be of many different types, and in some instances, the articles may be of sufficient value that it is desired to retrieve the articles at a later date.

For many years, it has been a common practice to embed various types of articles in a clear plastic such as Lucite and the like. In the past, it has been nigh impossible to retrieve many embedded articles, such as paper articles or other such readily damaged articles, without actually destroying such articles or without damaging the articles.

In the case where articles of paper, such as stamps or the like, are encapsulated within a clear plastic such as Lucite, the plastic material permeates the porous paper material and adversely affects the article so that it cannot be retrieved in its original condition.

In other cases wherein the embedded article may be of value, such as a gem or the like, it is extremely risky to attempt retrieval of the article since in removing the surrounding body of plastic material, the article may be chipped, marred or otherwise damaged.

Accordingly, in the prior art, it has been nigh impossible to successfully retrieve these embedded articles wherein the articles have been encapsulated within a solid piece or body of material such as Lucite.

On the other hand, some arrangements for display purposes have incorporated two or more separate pieces for enclosing an article. This type of arrangement does not provide as pleasing and aesthetic effect, and furthermore, wherein an arrangement is provided such that the article may be readily removed, this in itself may be undesirable since it is often desirable that the article not be readily accessible.

SUMMARY OF THE INVENTION

The present invention provides an arrangement wherein an article is completely embedded or enclosed by transparent material and provides a very pleasing, aesthetic effect. The article may not be readily removed by a casual observer, but then on the other hand, when it is desired to retrieve the article it can be retrieved in a relatively simple manner employing the method of the present invention.

A particularly advantageous feature of the present invention is the fact that the article in most instances is retrieved in its original condition without in any way damaging the article.

The objects of the present invention are obtained by first enclosing the article within a protective envelope or body means. This protective envelope means is of such a nature that it does not in any way adversely affect the article, whereas the final enclosing or body of material without the protective means may be of such a nature that it may prevent successful retrieval at a later date.

An object of the present invention is to provide a new article of manufacture and method of making same and for retrieving the article while the same is encapsulated or embedded in transparent material in their original condition when desired.

BRIEF DESCRIPTION OF THE DRAWINGS

FIG. 1 is a top view of an article to be encapsulated;
FIG. 2 is a top view illustrating two pieces of material employed for making the protective envelope means;
FIG. 3 illustrates one possible step in the method wherein a static charge is produced on the two pieces of material shown in FIG. 2;
FIG. 4 illustrates the article sandwiched between the pieces of material forming the protective envelope means;
FIG. 5 is a sectional view taken along line 5—5 of FIG. 4, looking in the direction of the arrows;
FIG. 6 illustrates one possible step in the method of the present invention wherein the edge portions of the protective envelope means are sealed.

DESCRIPTION OF THE PREFERRED EMBODIMENT

Figure 7:
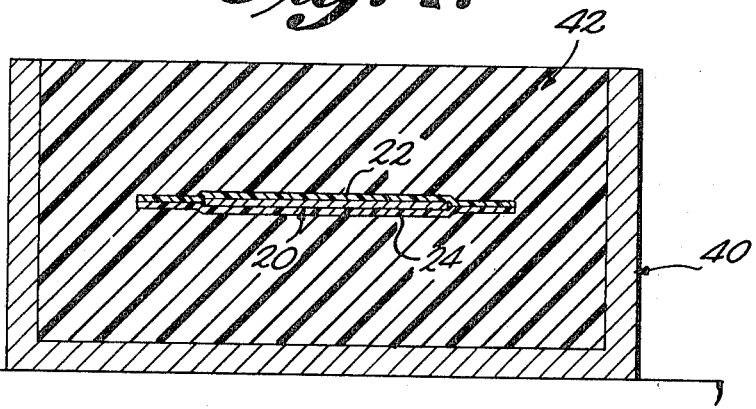
FIG. 7 is a sectional view illustrating a further step in the method of making the article of the present invention wherein the protective envelope means and the article therewithin are embedded within a central portion of a body of material.

Referring now to the drawings wherein like reference characters designate corresponding parts throughout the several views, FIG. 1 illustrates an article to be encapsulated. As illustrated, the article is a conventional postage stamp 20. This type of article presents a particular problem when it is desired to embed the article in a clear plastic substance such as Lucite, glass or other suitable transparent or translucent material. It is of course apparent that the article to be encapsulated may vary, and the postage stamp illustrated is simply for the purpose of description.

Referring now to FIG. 2, two pieces of material 22 and 24 are illustrated. Each of these pieces of material is of a transparent substance and preferably of plastic. It has been found that a .005 grade of Plexiglas or Mylar are suitable for use in the method of the present invention within the tolerances of heat and pressure to which they are subjected during the process. Plexiglas is the more rigid and lies flat, whereas Mylar has a slight tendency to curl or flex when embedded within a body of surrounding material.

Each of the pieces of material 22 and 24 are cut to size that will allow approximately ½ inch of space about the outer periphery of the embedded article 20 when the article is sandwiched between the two pieces of material.

This peripheral space about the embedded article may be required due to any possible presence of vapor run produced by the heat when the edges of the two pieces of material are sealed to one another.

Referring now to FIG. 3 of the drawings, a piece of material 30 comprising silk or nylon and the like is provided. The pieces of plastic 22 and 24 are drawn quickly over material 30 so as to produce a static charge on the surfaces of the pieces of material 22 and 24. Of course, suitable electronic devices or other automatic or semi-automatic devices may be used to induce the static charge.

Referring now to FIGS. 4 and 5, after the static charge has been produced on the surfaces of the pieces of material 22 and 24, the article 20 is sandwiched between these surfaces of the plastic pieces of material as illustrated, the article being substantially centered therebetween.

The static charge on the pieces of material 22 and 24 adheres the article 20 in place and holds it stationary thereby eliminating the possibility of it sliding out of its centered position when sandwiched between the pieces of plastic material. This static charge may also contribute to preventing vapor produced during the heat sealing process from the article.

Turning now to FIG. 6, a sealing means is indicated generally by reference numeral 34 and may comprise any suitable mechanism which is adapted to seal the adjacent edge portions of the two pieces of plastic material 22 and 24. The sealing means may comprise a suitable heating element, and it has been determined that electronic impulse sealing is perhaps the most practical method of sealing the edges of the pieces of plastic material.

As the sealing operation is carried out, vapor may build up within the envelope means produced by the two pieces of plastic material when they are sealed to one another. This vapor which may be present would have a tendency to run toward the center of the envelope means, and this may result in an adverse effect.

Accordingly, the heat sealing step should be carried out with caution so that excessive vapor is not produced.

After the heat sealing method has been carried out along the edges of the two pieces of plastic material, the article is within a protective envelope means. The envelope means may be formed of a Plexiglas, or mylar or the like and is of such a nature that it will protect the article and enable the article to be retrieved in its original condition at a later date.

Turning now to FIG. 7 of the drawings, the next step of the process is illustrated. As seen in this figure, a mold is indicated generally by reference numeral 40, and a body of transparent homogeneous material 42 is illustrated in the mold in surrounding or enclosing relationship to the protective envelope means and the enclosed article. In other words, in this step in the process of the present invention, the envelope means and the enclosed article are embedded within a preferably central portion of a body of material such as glass, Lucite or the like.

After the embedding step illustrated in FIG. 7 has been completed, the article is ready for display. Upon removal from the mold 40, the article is encapsulated so that it may be displayed for an indefinite period of time without deterioration or damage thereto.

Figure 8:
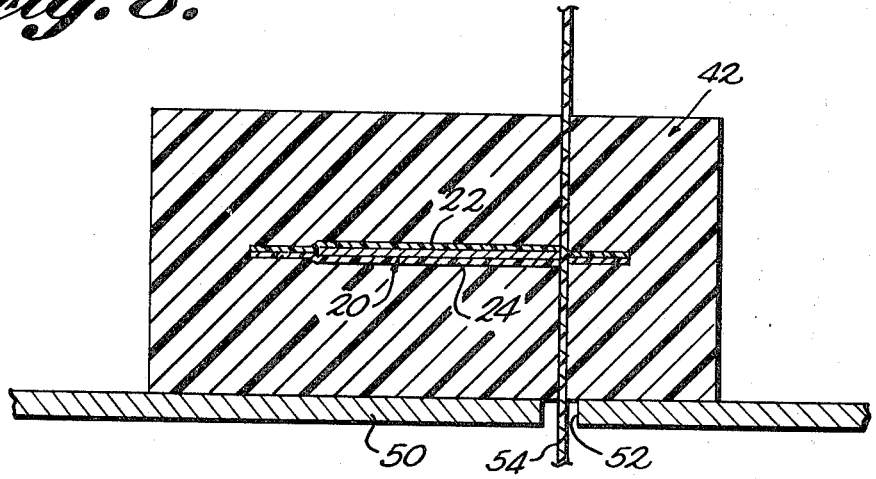
FIG. 8 illustrates a further step in the method of the present invention wherein it is desired to retrieve the article.

When it is later desired to retrieve the encapsulated article, this may be accomplished by a number of procedures and means. One example is that one may gain access for retreival of the article by cutting with a band saw or the like as shown by FIG. 8, or forming weakened portions in the block or body of transparent material and fracturing or opening the block by any means, or cutting along the weakened portions or by merely breaking the block into two or more pieces manually; or by embedding an electric resistance element in the block with terminals thereto exposed for connection with a source of electric current and for melting a portion of the block adjacent the article to enable its retrieval. As seen in this figure, the finished article is resting on a supporting surface 50 having a slot 52 formed therethrough. A conventional band saw is indicated by reference numeral 54, and the band saw may be employed for cutting the article as illustrated.

As the band saw cuts the article, it is apparent that a portion of the body 42 is removed as well as one edge portion of the protective envelope means.

Figure 9:
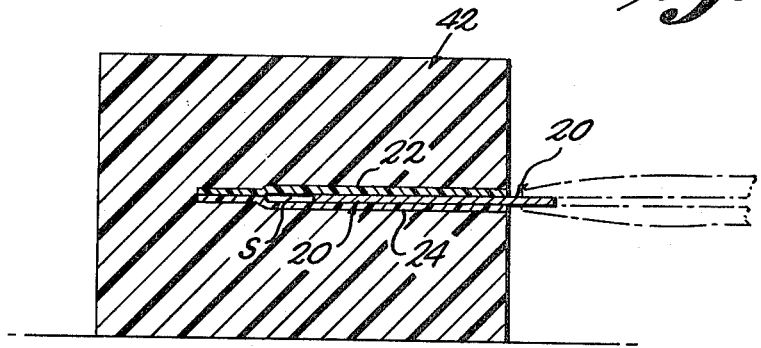
FIG. 9 is a sectional view illustrating a final step in retrieving the article.

Referring now to FIG. 9, after the cut has been completed, the encapsulated article may then be removed through a side edge of the protective envelope means, and the article thereby retrieved in its original condition without any damage thereto.

It is apparent from the foregoing that there is provided according to the present invention a new retrivable encapsulated article embedded or enclosed in transparent material and a method of retrieving the same. The article is completely encapsulated and protected for viewing and display purposes, and yet at the same time it may be readily retrived in original condition when desired.

As this invention may be embodied in severad forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A protected viewable retrievable article comprising a completely protecting enclosing means of transparent material about the article, said enclosing means being subject to separation to allow access to the article to retrieve same in substantially its original condition, the protective enclosing means being disposed in completely surrounding relationship to said article, said protective means being of transparent material, a body means formed of transparent material, and said protective envelope means and the enclosed article being embedded and completely surrounded by said body means.

2. An article as defined in claim 1 wherein edge portions of said protective envelope means are sealed completely therearound so that said article is sealed within said envelope means.

3. An article as defined in claim 1 wherein said protective envelope means includes two layers of material having outer edge portions extending beyond the outer dimensions of said article, the outer edge portions of said layers of material being sealed and bonded to one another.

4. An article as defined in claim 1 wherein said protective envelope means comprises two pieces of plastic material, the outer edge portions of said two pieces of plastic material being sealed and bonded to one another to completely seal said article within said envelope means, said body means comprising a one-piece homogeneous body of transparent material.

5. The method of encapsulating an article, placing said article in a sealed protective envelope means, and then embedding said envelope means and the enclosed article within a body of transparent material disposed in surrounding relationship to said envelope means and the article.

6. The method as defined in claim 5, wherein the step of placing said article within a sealed protective envelope means comprises providing two layers of plastic material, and then sandwiching said article between said two layers of plastic material.

7. The method as defined in claim 6, wherein the layers are two separate pieces and including the additional step of sealing the edges of said two pieces of plastic material after the article is sandwiched therebetween, said edges being sealed completely around the two pieces of plastic material.

8. The method as defined in claim 6, including the step of producing a static charge on said two pieces of plastic material before sandwiching said article between the two pieces of plastic material.

9. The method as defined in claim 5 including the additional steps of retrieving the encapsulated article by cutting said body of surrounding material and also cutting at least a portion of said protective envelope means, and then removing the article from said envelope means.

References Cited

UNITED STATES PATENTS

| 2,008,659 | 7/1935 | Salfisberg. | |
| 2,798,594 | 7/1957 | Dillon | 206—45.34 |
| 2,911,572 | 11/1959 | Francis et al. | 206—45.34 |

EUGENE R. CAPOZIO, Primary Examiner

W. J. CONTRERAS, Assistant Examiner